United States Patent [19]

Minoura

[11] Patent Number: 5,337,092
[45] Date of Patent: Aug. 9, 1994

[54] IMAGE DISPLAY APPARATUS

[76] Inventor: Nobuo Minoura, c/o Canon Kabushiki Kaisha 30-2, 3-chome, Shimomaruko, Ohta-ku, Tokyo, Japan

[21] Appl. No.: 691,537

[22] Filed: Apr. 25, 1991

[30] Foreign Application Priority Data

Apr. 27, 1990 [JP] Japan ................... 2-111963

[51] Int. Cl.$^5$ .................. H04N 9/16; H04N 9/64; H04N 5/46
[52] U.S. Cl. .................... 348/776; 348/809; 348/555
[58] Field of Search ............... 358/230, 237, 60, 64, 358/65, 67, 10, 11, 15, 29, 242–243, 168, 169, 140, 141, 28; H04N 7/00, 9/20, 9/16, 9/64, 5/46

[56] References Cited

U.S. PATENT DOCUMENTS

| | | |
|---|---|---|
| 3,638,065 | 1/1972 | Ueno . |
| 3,893,174 | 7/1975 | Sano et al. ............... 358/65 |
| 3,924,067 | 12/1975 | Arneson ................... 358/243 |
| 3,975,766 | 8/1976 | Sano et al. ............... 358/65 |
| 4,259,692 | 3/1981 | D'Amato ................. 358/237 |
| 4,668,977 | 5/1987 | Ohno et al. .............. 358/60 |
| 4,748,497 | 5/1988 | Sengoku .................. 358/65 |
| 4,771,334 | 9/1988 | Bolger ..................... 358/242 |
| 4,807,014 | 2/1989 | Van Gorkum et al. ..... 358/65 |
| 4,977,446 | 12/1990 | Shiomi et al. ............ 358/60 |

FOREIGN PATENT DOCUMENTS

| | | |
|---|---|---|
| 2327766 | 6/1973 | Fed. Rep. of Germany . |
| 0156791 | 6/1990 | Japan ............... H04N 9/16 |
| 03-3569 | 3/1991 | Japan ............... H04N 7/00 |
| 2225686 | 6/1990 | United Kingdom ........ H04N 9/64 |
| 2227911 | 8/1990 | United Kingdom ........ H04N 9/24 |

OTHER PUBLICATIONS

European Search Report dated Apr. 14, 1992 for EPO Appl. No. 91303724.8.

Primary Examiner—James J. Groody
Assistant Examiner—Glenton B. Burgess
Attorney, Agent, or Firm—Morgan & Finnegan

[57] ABSTRACT

The television apparatus of the present invention is a apparatus which displays an image corresponding to a television signal, where an image signal is received and, by use of the received image signal, a first image signal and a second image signal are generated, between which time axis is deviated by n times (n is an integral number of 2 n 10) of horizontal scanning period, and by providing a cathod ray tube which simultaneously emits a first electron beam corresponding to the first image signal and a second electron beam corresponding to the second image signal, so that a high precision picture can be displayed and at the same time the brightness of display can be improved.

33 Claims, 5 Drawing Sheets (AFTERGLOW CHARACTERISTIC OF FLUORSCENT SUBSTANCE MATERIAL)
| | FOR PROJECTION TUBE | FOR COLOR TV |
|---|---|---|
| BLUE :Zn:Ag·Al | 65 μs | 30 μs |
| GREEN :(ZnCd)s:Cu·Al | 2.0 ms | 60 μs |
| RED :Y2O2S:En | 1.9 ms | 1 ms |
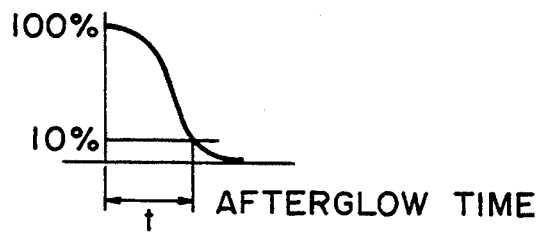
FIG. IA
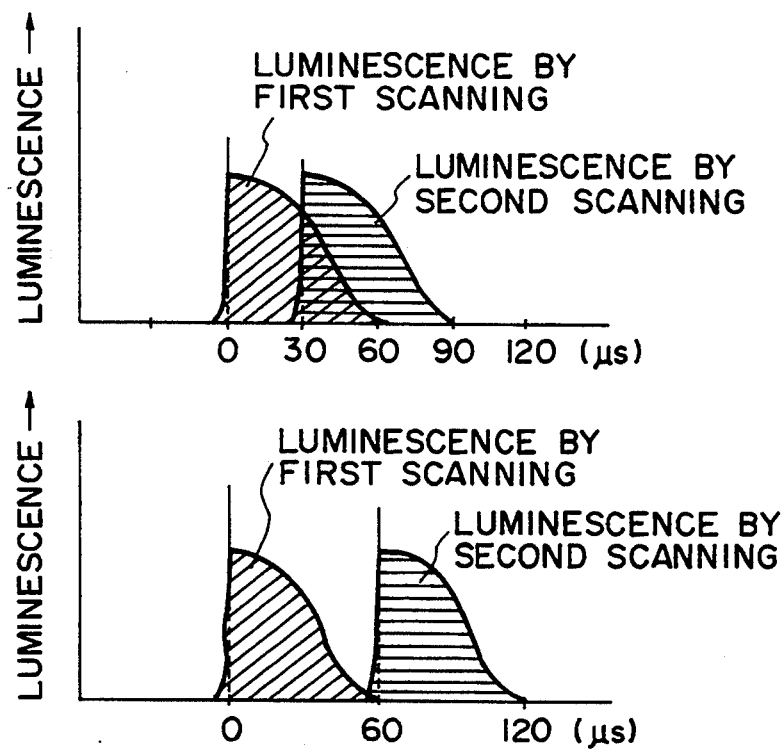
FIG. IB

INTERRUPTED LINE DENOTES BEAM
OF INTERLACED SCANNING

HORIZONTAL SCANNING TIME (H)

EDTV : $H_{ED}$ = 31.7 μs
HDTV : $H_{HD}$ = 30 μs

IMAGE DISPLAY APPARATUS

BACKGROUND OF THE INVENTION

1. Field of the Invention

The present invention is related to a television apparatus which displays an image corresponding to a television signal.

2. Related Background Art

In the conventional television apparatus, above all, in the projection type television device using the projection tube, high luminance can be usually obtained by raising the anode voltage or beam current to the projection tube. However, in the case of the method to increase the anode voltage of the projection tube, there is a limitation in increasing the anode voltage, as X-ray generation amount is increased, and the pressure resistance of the glass at the projection tube, withstand voltage of inner electrode, etc. must be considered. In the case of electron beam amount increasing method by raising the beam current in the projection tube, where a single electron gun is used, the electron beam spot is enlarged at the high luminance time and, accordingly, the high precision degree is lowered, and such high prevision television signals as-EDTV, HDTV, etc. can not be reproduced sufficiently.

In this connection, as shown in the Japanese Laid-Open Patent Application No. 62-245792, an interference film filter is placed in front of red and green projection tube and such a blue projection tube is used, where 2 electron guns are provided, and the said blue projection tube is supplied with a television signal which is not delayed and also with a television signal which is delayed by one horizontal scanning period, so that the respective electron guns may be driven. In this way, the above problems found in the prior art are solved. However, since these electron guns are so arranged as to drive the television signal delayed by 1H (1 horizontal scanning period), it is necessary to make the afterglow time of a fluorescent body of blue projection tube to be shorter than 30 μs, in the case of high precision television signals like EDTV or HDTV.

On the other hand, the afterglow time of blue fluorescent substances (Zn: Ag.Al) for such a projection tube as is aimed, as explained above, to have high luminance, is as long as 65 μs (refer to FIG. 1A). This afterglow time is more than double in comparison with 1 horizontal scanning period (i.e., 30 μs) of such high precision television signal as EDTV or HDTV.

The electron beam, supplied from the first electron gun to be driven by the television signal which is delayed by 1H, carries out the re-scanning, which the fluorescent body is still brightened by the scanning with the first electron gun and not yet sufficiently subdued. Hence, it cannot be so much expected that the luminance may be raised through the double scanning by the electron beam generated by 2 electron gun. (Refer to FIG. 1B)

SUMMARY OF THE INVENTION

The present invention aims to offer such a television apparatus as can solve the said problems.

Another purpose of this invention is to offer such a television apparatus as can raise the brightness of picture to be displayed.

In order to achieve the purpose of the present invention, there is provided a television apparatus which displays a image corresponding to a television signal, comprising image signal generation means for receiving an image signal, and by use of the received input image signal, for generating a first image signal and a second image signal, between which the time axis is deviated mutually by "n" times of the horizontal scanning period ("n" is an integer of $2 \leq n \leq 10$), and a cathode ray tube for simultaneously emitting a first electron beam corresponding to the first image signal to be generated by the image signal generation means, and a second electron beam corresponding to the second image signal generated by the image signal generation means.

Meanwhile, another purpose of the present invention is to present a television apparatus as can display a high precision image.

The television apparatus of this invention is an apparatus which displays an image corresponding to the television signal, comprising image signal generation means for receiving an image signal and by use of the input picture signal, for generating a first image signal and second image signal, between which the time axis is deviated mutually by "n" times of the horizontal scanning period ("n" is an positive integer); a cathod ray tube for simultaneously emitting a first electron beam corresponding to the first image signal generated by the image signal generation means and a second electron beam corresponding to the second image signal generated by the image signal generation means; and deflection operation control means for controlling deflection operations of the first electron beam and second electron beam in the cathode ray tube in such a way that, in the cathode ray tube, an arrival position of the second electron beam on the display screen is deviated from the arrival position of the first electron beam by the distance of "n" horizontal scanning lines.

Further, another objective of the present invention is to present a television apparatus as can display the optimum picture in response to the mutually different television systems.

The television apparatus of this invention is an apparatus which displays an image corresponding to a television signal, comprising an image signal input means for receiving a plural number of image signals corresponding to mutually different television systems; delay means having a plurality of different kinds of delay times for delaying for one of the delay times, among a plural number of the said delay times, the image data received by the image signal input means; and a cathode ray tube for emitting simultaneously a first electron beam corresponding to the image signal received by the image signal input means and a second electron beam corresponding to the image signal delayed by the delay means.

Other purposes of the present invention than the above and its characteristics are clarified through the detail explanation of the embodiments of the present invention in reference to the following drawings.

BRIEF DESCRIPTION OF THE DRAWINGS

FIG. 1A shows the comparison of afterglow time of fluorescent substances;

FIG. 1B is a drawing to expand the luminescence action of the fluorescent substances when the double scanning is carried out with the electron beam generated by 2 electron guns;

BRIEF DESCRIPTION OF PREFERRED EMBODIMENTS

Following explanation on this invention is given in reference to the embodiment of the present invention.

Figure 2:
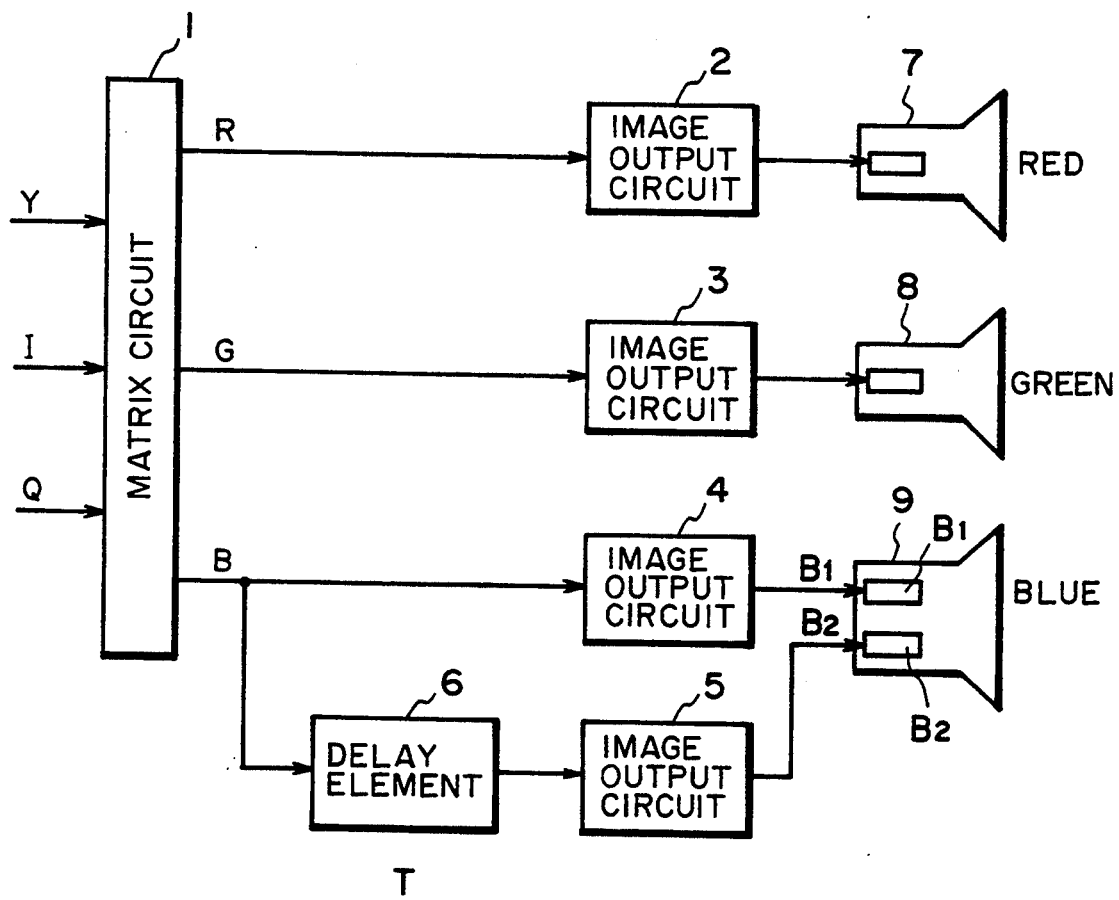
FIG. 2 shows the components of projection type television device as a first embodiment of this invention.

FIG. 2 shows the system of components of projections type television apparatus as a first embodiment of this invention.

In FIG. 2, 1 denotes a matrix circuit.

2, 3, 4 and 5 represent image output circuits which amplify respective colour image signals.

6 shows the delay element.

7 is the projection tube which displays a red colour image.

8 is a projection tube which displays a green colour image.

9 shows a projection tube which displays a blue colour image. The projection tube has 2 electron guns B1 and B2.

The luminance signals received as input (Y in FIG. 2) and colour difference signals (I, Q in FIG. 2) are converted into the colour image signals of R (red), G (green) and B (blue). R and G signals are amplified in the image output circuits 2 and 3 respectively and drive the projection tubes 7 and 8 for red and green respectively. B signal is branched out into 2 lines, and one of them is directly amplified in the image output circuit 4 and drives the first electron gun B1 of the projection tube 9 for blue colour.

Figure 3:
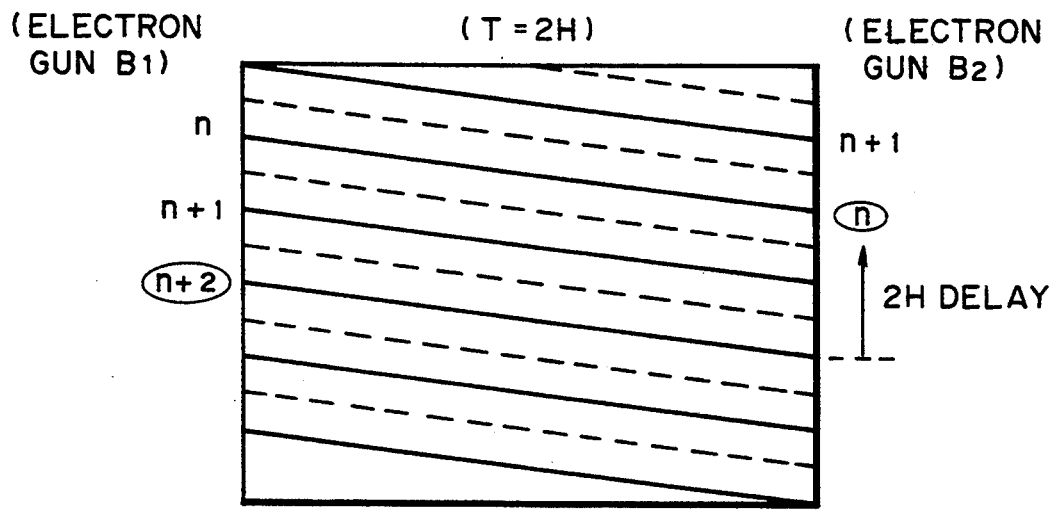
FIG. 3 is the explanatory drawing on the electron beam scanning in the projection tube to display the blue image of the above FIG. 2.

Another B signal is delayed with the delay element 6 by the time T and then is amplified at the image output circuit 5 and thereafter drives the second electron gun B2 of the blue projection tube 9. In case the delay time T of delay element 6 is T=2H (H is one horizontal scanning period), the scanning n+2 by the first electron gun B, as shown in FIG. 3 and the scanning n by the second electron gun B2 are carried out simultaneously, which the scanning n is delayed by 2H. In other words, the scanning in accordance with the same image signal is conducted twice at the internal of 2H and the fluorescent substance is brightened accordingly, and the apparent brightness of the scanning line is doubled in comparison with the case of one electron gun use.

Figure 4:
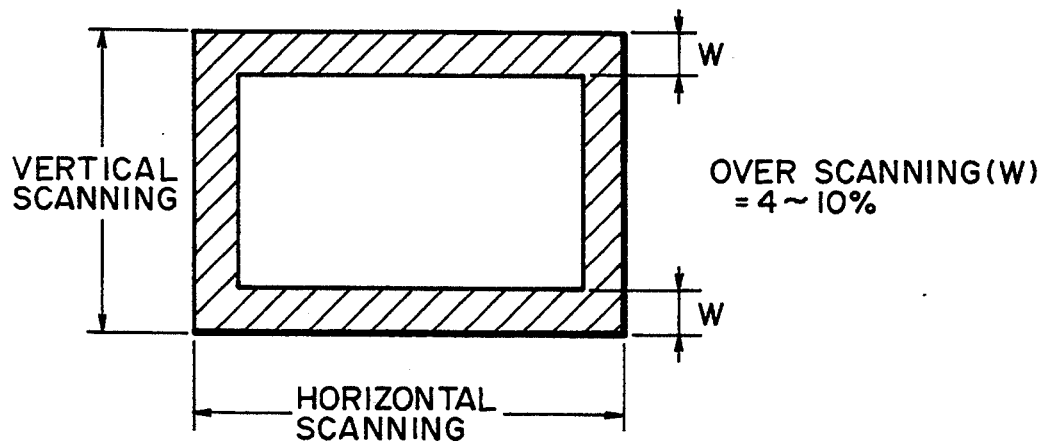
FIG. 4 is the explanatory drawing of the overscanning action in the projection tube of the above FIG. 2.

Meanwhile, the delay time T is found in the range of t1 T t2 in accordance with the afterglow time of fluorescent to substance shown in the above FIG. 1A and tile overscanning amount shown in FIG. 4.

$$t1 = \frac{\text{Afterglow time of fluorescent substance}}{\text{Horizontal scanning time}} = \frac{65\ \mu s}{31.7\ \mu s} \simeq 2.05H$$

-continued $$t2 = \frac{\text{Effective vertical scanning time}}{\text{Effective horizontal scanning time}} \times \frac{\text{Overscanning}}{2}$$

$$= \frac{16.7\ \text{ms} \times 0.04}{31.7\ \mu s \times 2} \simeq 10.5H$$

Accordingly, the delay time T is found in the range of $2H \leq T \leq 10H$ (whereas T is the horizontal scanning period of integral number multiplication and H is the horizontal scanning period).

t1: To be decided by the relation between the fluorescent substance afterglow time.

t2: To be decided by the overscanning amount.

Figure 5:
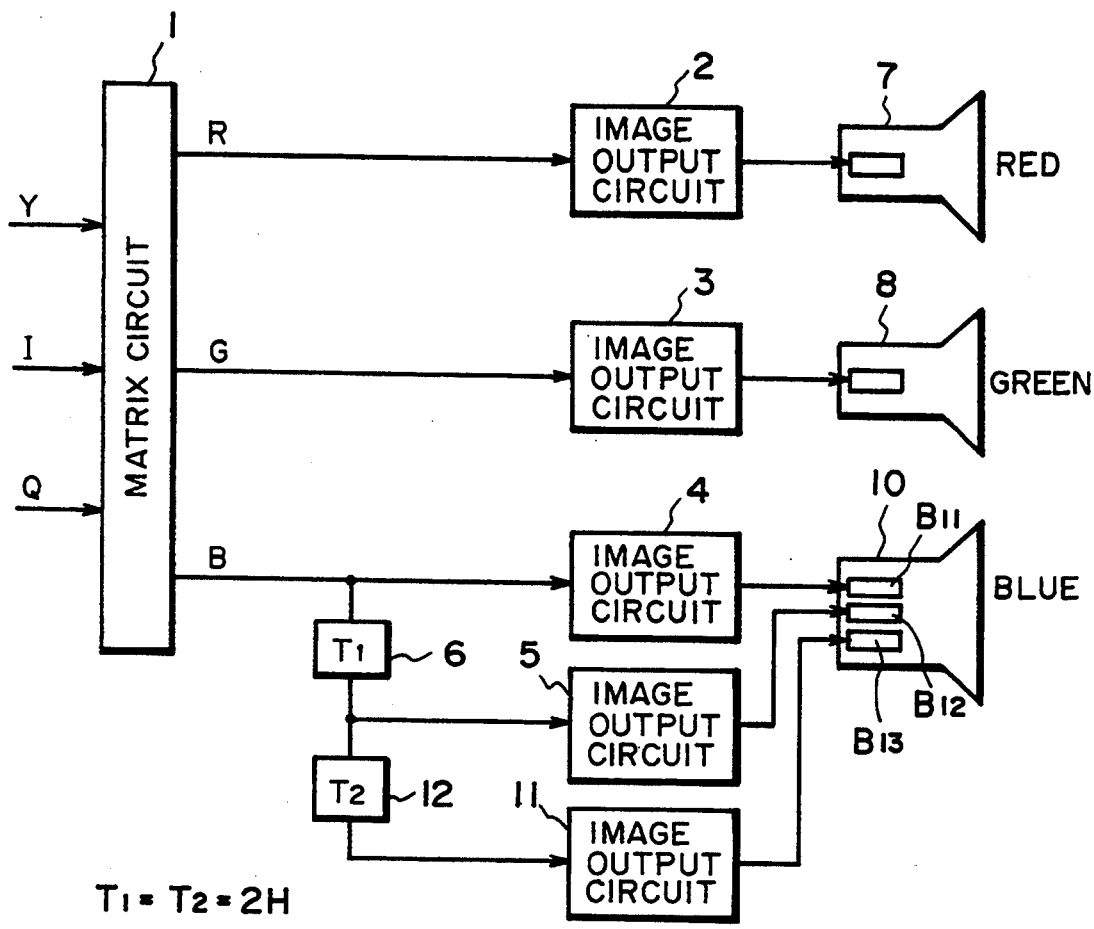
FIG. 5 shows the components of projection type television device as a second embodiment of this invention.

FIG. 5 shows the system of components of the projection type television as a second embodiment of this invention. The same number/sign is attached to the same components in the above FIG. 2.

In the second embodiment, the delay time T1 and T2 of delay elements 6 and 9 is set as 2H, and the blue colour protection tube 10 having 3 electron guns of B11, B12 and B13. In comparison with the first embodiment shown in the above FIG. 2, the brightness of the scanning line can be increased by 50% further.

Figure 6:
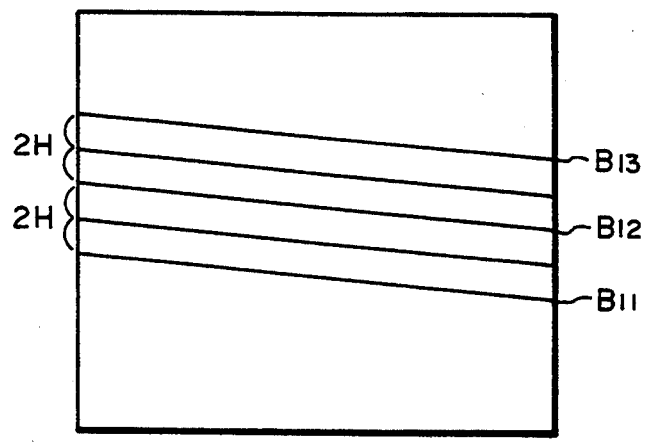
FIG. 6 is the explanatory drawing on the electron beam scanning in the projection tube to display the blue image of the above FIG. 5.

FIG. 6 shows the relation of scanning beams to be generated by 3 electron guns on the image picture of blue colour projection tube.

Figure 7:
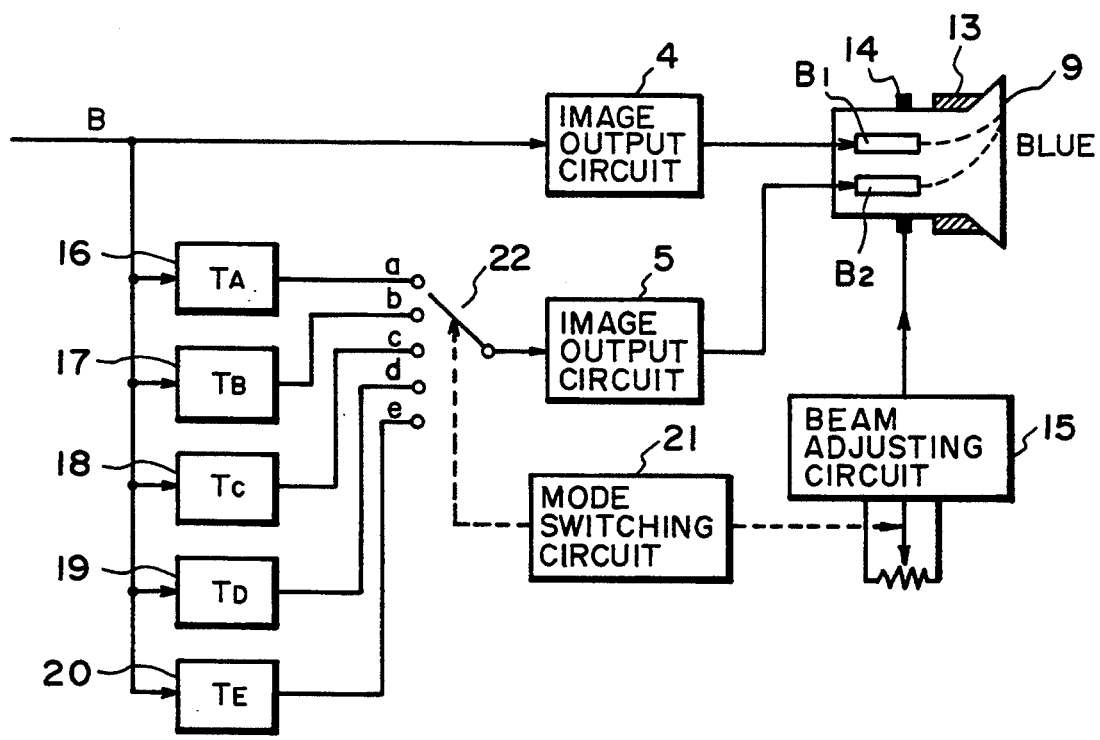
FIG. 7 shows the components of projection type television device as a third embodiment of this invention.

FIG. 7 shows the system of components in the projection type television apparatus as a third embodiment of this invention. The same number/sign is attached to the same components in the above FIG. 2, and detail explanation is omitted.

Meanwhile, the projection type television apparatus shown in FIG. 7 is of multi-system applicable model, which can receive the input of various kinds of television signal of NTSC system, PAL/SECAM system, ED/ADTV system, HDTV system, etc. as well as the video signal from personal computers, and can give the image picture display.

In FIG. 7, 13 is the deflection yoke of projector tube 9 for blue colour. 14 is the control coil which deflects the beam emitted from the electron guns B1 and B2 to the vertical direction of the picture screen. 15 is the beam adjustment circuit which controls the beam deflecting action of the said control coil 14. 21 is the mode change-over circuit which changes over the display mode, depending on which display action is undertaken in response to the television signal from various kinds of the said television signals or the video signal output from personal computer. 22 is the change-over switch, which supplies the output signal by changing over from the delay elements 16–20 to be explained later in response to the instruction of the said mode change-over circuit 21, to the picture image output circuit 5.

In FIG. 7, 16–20 are the delay elements respectively, and the delay time of the said delay elements is set at the least value among the time obtained by the following formulae in response to the image signal to be displayed respectively.

$$\frac{\text{Fluorescent substance afterglow time}}{\text{Horizontal scanning time}} H \leq T \leq \left( \frac{\text{Effective vertical scanning time}}{\text{Horizontal scanning time}} \times \frac{\text{Overscanning}}{2} \right) H$$

Namely, the delay time TA of delay element is set at 63.5 μs which corresponds to 1 horizontal scanning line period of NTSC system television signal. The delay time TB of delay element 17 is set at 64 μs which corresponds to 1 horizontal scanning line period of PAL/SECAM system television signal. The delay time TC of delay element 18 is set at 63.5 μs which corresponds to 2 horizontal scanning line periods of television signal of ED/ADTV television signal. The delay time TD of delay element 19 is set at 60 μs which corresponds to 2 horizontal scanning line periods of HDTV system television signal. The delay time TE of delay element 20 is set at 60 μs which corresponds to 4 horizontal scanning line periods of video signal output from the personal computer.

In FIG. 7, the display mode is instructed by the operation section which is not shown in the drawing, and either one of the said plural kinds of television signals or video signal is received as input. Then, the said mode change-over circuit 21 regulates the said change-over switch 22 in response to the instructed display mode, and gives one of the signals supplied as output from the said delay elements 16–20, to the image output circuit 5.

Then, the signal given via the above change over switch 22 is amplified in the image output circuit 5 and is thereafter supplied to the electron gun B2 of projection tube 9 for blue colour.

In the mode change-over circuit 21, 2 beams are emitted from the electron guns B1 and B2 of the said projection tube for blue colour by the beam adjustment circuit 15. The deflection action of 2 beams in the said deflection control coil 14 is controlled in such way that the distance relation to vertical direction of the said 2 beams may be 1H in the case of display mode corresponding to NTSC system or PAL/SECAM system, 2H in the case of ED/ADTV system or HDTV system, and 4H in the case of display mode to show the video signal given from the personal computer output.

The display modes explained in this embodiment do not mean any restruction in mode but the same effect can be obtained by applying the present invention to the projection type television device having other combination display mode.

As explained above, the projection tube for blue colour in the present invention is equipped with a plural number of electron gun. By driving a plural number of said electron gun with the image signals which are time-wise apart by such a period as corresponds to the integral number multiplication of horizontal scanning period, a high precision image picture can be displayed, which has the same resolution degree with the case of signal electron gun use, even when the beam current to the said projection tube for blue colour is increased by the number of electron guns. At the same time, the brightness can be raised and improved by the number of electron guns.

What is claimed is:

1. A television apparatus which displays an image corresponding to a television signal, comprising:
   (a) an image signal generating means for receiving an image signal and for generating a first image signal and a second image signal from the received image signal with a deviation whose amount is limited by an amount of overscanning being provided between a time axis of the first and second image signals; and
   (b) a cathode ray tube which simultaneously emits a first electron beam corresponding to the first image signal generated by said image signal generating means and a second electron beam corresponding to the second image signal generated by said image signal generating means.

2. An apparatus according to claim 1, wherein said image signal generation means includes delay means having a delay time which is equal to "n" times (where "n" is an integer and $2 \leq n \leq 10$) the horizontal scanning period, and is arranged so as to output an image signal, which is not processed with said delay means as the first image signal and an image signal which is delayed with said delay means as the second image signal.

3. An apparatus according to claim 1, wherein said cathode ray tube includes:
   (a) a first electron gun which is driven by the first image signal generated by said image signal generation means and emits said first electron beam; and
   (b) a second electron gun which is driven by the second image signal generated by said image signal generation means and emits the said second electron beam.

4. An apparatus according to claim 1, wherein said image signal include an image signal of blue colour component.

5. An apparatus according to claim 1, further comprising deflection operation control means for controlling a deflection operations of the first electron beam and the second electron beam in the said cathode ray tube, so that in the cathode ray tube, an arrival position of said second electron beam on the display screen is deviated from an arrival position of the first electron beam by the distance equal to "n" horizontal scanning lines.

6. A television apparatus which displays an image corresponding to a television signal, comprising:
   (a) an image signal generating means for receiving an image signal and for generating a first image signal and a second image signal from the received image signal, with a deviation whose amount is limited by an amount of overscanning being provided between a time axis of the first and second image signals; and
   (b) a cathode ray tube for emitting simultaneously a first electron beam corresponding to the first image signal generated by said image signal generating means and a second electron beam corresponding to the second image signal generated by said image signal generating means; and
   (c) deflection operation control means for controlling deflection operations of the first electron beam and the second electron beam in said cathode ray tube, so that an arrival position of said second electron beam on the display screen in said cathode ray tube is deviated from an arrival position of said first electron beam by the distance equal to "n" horizontal scanning lines, wherein "n" is a positive integer.

7. An apparatus according to claim 6, wherein said cathode ray tube is so arranged that a fluorescent substance is provided at an arrival face of said first and second the electron beam.

8. An apparatus according to claim 7, wherein said image signal generation means is arranged so as to, by use of said image signal received, generate the first image signal and the second image signal, between which time axis is mutually deviated by "n" times (n is an integer more than the value of (afterglow time/horizontal scanning time) of said fluorescent substance) the horizontal scanning period.

9. An apparatus according to claim 7, wherein said image signal generation means includes delay means having a delay time which is "n" times (n is an integer more than the value of (afterglow time/horizontal scanning time) of the fluorescent substance) the horizontal scanning period and is arranged so as to output an image signal which is not delayed by said delay means, as the first image signal and output an image signal which is processed by said delay means, as the second image signal.

10. An apparatus according to claim 6, wherein said cathode ray tube is arranged so as to overscan a wider range than an effective picture screen of said image signal by means of the first and second electron beams.

11. An apparatus according to claim 10, wherein said image signal generation means is arranged so as to generate, by use of said image signal output, the first image signal and the second image signal, between which the time axis is deviated each other by "n" times the horizontal scanning period, where "n" is an integer less than the value of (effective vertical scanning time/horizontal scanning time)×{(vertical scanning time−effective vertical scanning time) vertical scanning time/2}.

12. An apparatus according to claim 10, wherein said image signal generation means includes delay means having a delay time equal to "n" times horizontal scanning period where n is an integer less than the value of (effective vertical scanning time/horizontal scanning time)×{(vertical scanning time−effective vertical scanning time)÷vertical scanning time/2}, and is arranged so as to output an image signal which is not processed by said delay means, as the first image signal, and to output an image signal which is processed by said delay system, as the second image signal.

13. A television apparatus which displays an image corresponding to a television signal, comprising:
 (a) image signal formation means for receiving a color image signal and forming from the received color image signal, an image signal for a red component, an image signal for a green component and an image signal for a blue component;
 (b) image signal generating means for receiving the image signal for said blue component formed by said image signal formation means, and for generating a first blue component image signal and a second blue component image signal from the received image signal for said blue component with a deviation whose amount is limited by an amount of overscanning being provided between a time axis of the first and second blue component image signal; and
 (c) a first cathode ray tube which emits an electron beam corresponding to the image signal for said green component formed by said image signal formation means; and
 (d) a second cathode ray tube which emits an electron beam corresponding to the image signal for said red component formed by said image signal formation means; and
 (e) a third cathode ray tube which simultaneously emits a first electron beam corresponding to said first blue component image signal generated by said image signal generating means, and a second electron beam corresponding to said second blue component image signal generated by said image signal generating means.

14. An apparatus according to claim 13, wherein said image signal generation means includes a delay means having a delay time equal to "n" times horizontal scanning period ("n" is an integer 2≦n≦10) and is arranged so as to output an image signal for blue component which is not processed by said delay system, as first blue component image signal, and an image signal for blue component which is delayed by said delay system, as the second blue component image signal.

15. An apparatus according to claim 13, wherein said third cathode ray tube includes:
 (a) a first electron gun which is driven by said first blue component image signal generated by the said image signal generation means, and which emits said first electron beam; and
 (b) a second electron gun which is driven by said second blue component image signal generated by the said image signal generation means, and which emits said second electron beam.

16. An apparatus according to claim 13, further comprising deflection operation control means for controlling a deflection operations of the first electron beam and second electron beam in the said third cathode ray tube so that in the said third cathode ray tube, an arrival position of the second electron beam on the display picture screen is deviated from an arrival position of said first electron beam by n times of horizontal scanning line.

17. An apparatus according to claim 13, wherein said image signal formation means includes a matrix circuit which receives a colour image signal composed of a luminance signal and two kinds of colour difference signal and converts the received colour image signal into an image signal of red component, an image signal of green component and an image signal of blue component.

18. A television apparatus which displays a color image corresponding to a color television signal, comprising:
 (a) color image signal input means capable of receiving several different color image signals corresponding to mutually different color television systems;
 (b) delay means having a plurality of different delay times, for delaying only the image signal of a blue component of the color image signals received by said color image signal input means, by a delay time selected from among the said plurality of delay times according to the color image signals received by said color image signal input means; and
 (c) a cathode ray tube which emits simultaneously a first electron beam corresponding to the image signal of the blue component of the color image signals received by said color image signal input means, and a second electron beam corresponding to the image signal of the blue component which is delayed by said delay means.

19. An apparatus according to claim 18, wherein said cathode ray tube includes:
 (a) a first electron gun which is driven by the image signal of the blue component of the color image signals received by said color image signal input means and which emits said first electron beam; and
 (b) a second electron gun which is driven by the image signal of the blue component delayed by said delay means and which emits said second electron beam.

20. An apparatus according to claim 18, further comprising deflection operation control means for controlling deflection operations of the first electron beam and the second electron beam in the cathode ray tube in such way that in the said cathode ray tube, said first electron beam and said second electron beam may arrive at the positions being apart from each other by a distance corresponding to the color television system of the color image signal received by said color image signal input means.

21. An apparatus according to claim 18, wherein said color image signal input means is arranged so as to received color image signals corresponding to NTSC television system, PAL/SECAM television system, AD/ED television system, HD television system and image signal system of personal computer.

22. An apparatus according to claim 21, wherein said delay means includes:
   (a) a first delay element which delays the image signal of the blue component of the color image signals received by said color image signal input means by a period corresponding to NTSC television system or PAL/SECAM television system;
   (b) a second delay element which delays the image signal of the blue component of the color image signals received by said color image signal input means by a period corresponding to AD/ED television system or HD television system;
   (c) a third delay element which delays the image signal of the blue component of the color image signals received by said color image signal input means by a period corresponding to an image signal output system of the personal computer; and
   (d) output means for outputting one of the image signals of the blue component delayed by said first delay element, second delay element and third delay element, according to the type of system corresponding to the color image signals received by said color image signal input means.

23. An apparatus according to claim 21, wherein said delay means includes:
   (a) a first delay element which delays the image signal of the blue component of the color image signals received by said color image signal input means by one horizontal scanning period;
   (b) a second delay element which delays the image signal received by said image signal of the blue component of the color image signals received by said color image signal input means by two horizontal scanning periods;
   (c) a third delay element which delays the image signal received by said image signal of the blue component of the color image signals received by said color image signal input means by four horizontal scanning periods; and
   (d) output means for outputting one of the image signals of the blue component delayed by said first delay dement, second delay element and third delay element.

24. An apparatus according to claim 21, further comprising deflection operation control means for controlling deflection operations of the first electron beam and second electron beam in said cathode ray tube in such a way that, in the said cathode ray tube, said first electron beam and said second electron beam arrive respectively at positions being apart by a distance corresponding to a color television system of the color image signals received by said color image signal input means.

25. An apparatus according to claim 24, wherein said deflection operation control means is so arranged that the deflection operations of the first electron beam and second electron beam in said cathode ray tube is controlled in such a way that an arrival position of said second electron beam is found at a position which is deviated from the arrival position of said first electron beam by one horizontal scanning line distance at the display screen of said cathode ray tube, if the color image signals received by said color image signal input means corresponds to NTSC television system or PAL/SECAM television system.

26. An apparatus according to claim 24, wherein said deflection operation control means is so arranged that the deflection operations of the first electron beam and second electron beam in said cathode ray tube is controlled in such a way that an arrival position of said second electron beam is found at a position which is deviated from the arrival position of the said first electron beam by two horizontal scanning line distance at the display screen of said cathode ray tube, if the color image signals received by said color image signal input means corresponds to AD/ED television system or HD television system.

27. An apparatus according to claim 24, wherein said deflection operation control means is so arranged that the deflection operations of the first electron beam and second electron beam in said cathode ray tube is controlled in such a way that an arrival position of the said second electron beam is found at a position which deviated from the arrival position of the said first electron beam by four horizontal scanning line distance at the display screen of the said cathode ray tube, if the color image signals received by said color image signal input system corresponds to the image signal output system of personal computer.

28. An apparatus according to claim 18, wherein said color image signals include the image signal of a red component, the image signal of a green component, and the image signal of a blue component.

29. A television apparatus which displays an image corresponding to a television signal, comprising:
   (a) image signal generating means for receiving an image signal and for generating a first image signal, it second image signal and a third image signal from the received image signal with a deviation whose amount is limited by an amount of overscanning being provided between a time axis of the first, second and third image signals; and
   (b) a cathode ray tube which emits simultaneously a first electron beam corresponding to the first image signal generated by said image signal generating means, a second electron beam corresponding to the second image signal generated by said image signal generating means, and a third electron beam corresponding to the third image signal generated by said image signal generating means.

30. An apparatus according to claim 29, wherein said image signal generating means includes first and second delay means each having a delay time equal to "n" times the horizontal scanning time (n is the integer of $2 \leq n \leq 10$), and is arranged so as to output an image signal which is not processed by said first and second delay means as a first image signal, and an image signal which is processed by said first delay means as a second image signal, and an image signal which is delayed by both first and second delay means as a third image signal.

31. An apparatus according to claim 29, wherein said cathode ray tube includes:

(a) a first electron gun which is driven by the first image signal generated by said image signal generation means and emits said first electron beam;
(b) a second electron gun which is driven by the second image signal generated by said image signal generation means and emits said second electron beam; and
(c) a third electron gun which is driven by the third image signal generated by said image signal generation means and emits said third electron beam.

32. An apparatus according to claim 29, wherein said image signal includes an image signal for blue colour component.

33. An apparatus according to claim 29, further comprising deflection operation control means for controlling a deflection operations of the first electron beam, second electron beam and third electron beam in said cathode ray tube in such a way that, in said cathode ray tube, an arrival position of said second electron beam on the display screen is deviated from an arrival position of said first electron beam by a distance of "n" horizontal scanning lines and an arrival position of said third electron beam is deviated from the arrival position of said second electron beam by the distance of "n" horizontal scanning lines.

* * * * *

UNITED STATES PATENT AND TRADEMARK OFFICE
CERTIFICATE OF CORRECTION

PATENT NO. : 5,337,092
DATED : August 9, 1994
INVENTOR(S) : Nobuo Minorua

It is certified that error appears in the above-indentified patent and that said Letters Patent is hereby corrected as shown below:

On the title page, before "[21] App. No.: 691,537" insert the following:

--[73] Assignee: Canon Kabushiki Kaisha, Tokyo, Japan--.

Signed and Sealed this

Twentieth Day of June, 1995

Attest:

BRUCE LEHMAN

*Attesting Officer*　　　*Commissioner of Patents and Trademarks*